Sept. 13, 1949.
L. BLOK
2,481,900
AUDIOMETER
Filed May 3, 1946
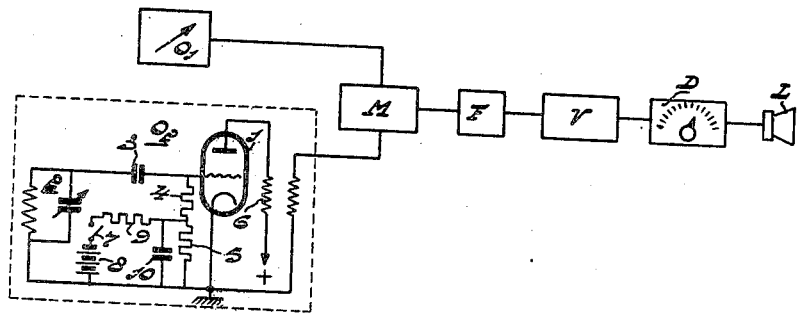
INVENTOR
LOURENS BLOK
BY
AGENT Patented Sept. 13, 1949

2,481,900

UNITED STATES PATENT OFFICE 2,481,900

AUDIOMETER

Lourens Blok, Eindhoven, Netherlands, assignor, by mesne assignments, to Hartford National Bank and Trust Company, Hartford, Conn., as trustee Application May 3, 1946, Serial No. 666,870
In the Netherlands August 14, 1941

Section 1, Public Law 690, August 8, 1946
Patent expires August 14, 1961

6 Claims. (Cl. 179—1)

For the exact examination of the acuity of hearing of persons it is desirable to determine quantitatively in dependence on frequency the deterioration of the sensitiveness of the ear with respect to that of a normal person.

For such an examination use is preferably made of a so-called audiometer with the aid of which it is possible to generate an audible tone of adjustable frequency whose intensity can be regulated at least in a step-wise manner.

There are known audiometers which comprise a tube generator for generating a low-frequency alternating voltage of adjustable frequency (measuring signal), which measuring signal is supplied, via an amplifier and an adjustable attenuator, to a reproducing device whilst in view of the so-called masking examination, which is usual in the case of unilateral deafness, there is provided an auxiliary switch for interrupting the measuring signal for a short time.

With an audiometer care should be taken, to a much higher extent than with the usual applications of low-frequency generators and amplifiers, to avoid the production of parasitic noises such, for example, as the rustling noise of the amplifier, the hum of the mains and the like, since they might influence the obtained measuring results in an objectively uncontrollable manner.

The invention has for its object to improve audiometers and thus to avoid in a simple manner any parasitic noise which has under certain conditions a greatly disturbing effect on the results of the measurement.

There occur errors in measurement if, in order to avoid faulty measuring results due to the phenomena of fatigue of the patient, in the normal examination of the ear each time at first the desired intensity of the measuring signal is adjusted with the aid of the attenuator and only then the reproducing device is switched into circuit.

According to the invention, the errors in measurement which occur with the above-mentioned method of examination, are avoided by suppressing at least partly the audible components of the frequency spectrum of the interfering voltages set up due to switching-on phenomena and supplied to the reproducing device upon the auxiliary switch being shifted.

It should be observed that in the present case the said switching-on phenomena are particularly troublesome since for frequencies, for example, of from 1000 to 2000 cycles per sec. the sensitiveness of the ear is in ordinary cases relatively appreciably greater than that for other frequencies so that, as the applicant has further stated, in taking measurements, for example, at 50 or 100 cycles per sec., it occurs that the patient no longer perceives the measuring signal itself but does perceive an interfering voltage of a frequency located, for example, between 1000 and 2000 cycles per sec. and of a comparatively lower amplitude than the measuring signal itself, which interfering voltage is set up due to the measuring signal being switched on and off, and on account of this interfering voltage he still thinks to perceive the measuring signal.

In order to avoid with absolute certainty errors in measurement due to the said interfering voltages even in the case of highly abnormal sensitivity curves of the ear, the components of the frequency spectrum of the interfering voltages produced upon the auxiliary switch being shifted are preferably suppressed to such an extent that at the most these components cause a sound of an intensity which is still just imperceptible to the normal ear.

The desired suppression of interfering voltages may be effected in different ways, for example, by causing, upon switching-on the measuring signal, the anode voltage and/or the screen grid voltage of one of the amplifying tubes utilized to increase gradually to its normal value in such manner that the audible frequency components of the switching-on current impulse, which components may occur in this case, only exhibit a very small amplitude. For this purpose, the supply voltage concerned is preferably supplied, via the auxiliary switch and a retarding network which may consist of a simple resistance-condenser circuit, to the anode and/or to the screen grid of the tube.

It has been found that substantially no errors due to switching-on phenomena occur in the measurement if the time constant of the resistance-condenser circuit connected to the auxiliary switch exceeds 0.05 sec.; the time constant preferably amounts to about 0.2 sec.

There are substantially two causes of the production of interfering voltages: they may occur due to the closure or interruption of a direct-current circuit or again due to the fact that the auxiliary switch is shifted at a moment when the instantaneous value of the measuring signal has a value which differs from zero.

In connection with the first-mentioned cause it is advantageous to provide the auxiliary switch in the control grid circuit of one of the tubes utilized in the audiometer, In view of the last-mentioned cause the generator is preferably put into operation by means of the auxiliary switch. Upon switching the oscillator tube into circuit the amplitude of the produced measuring signal automatically increases slowly to the final value in a period of time which is determined by the quality of the oscillator circuit.

A further cause of disturbance may reside in the fact that during the retarded switching-on operation higher harmonics of the measuring signal are produced. Also in connection therewith it is advantageous, in order to avoid non-linear distortion, to set the generator into operation with the aid of the auxiliary switch instead of switching one of the amplifying tubes into circuit with the aid of the said switch and/or to provide this switch in the control grid circuit of a lightly loaded electron tube having a grid voltage-anode current characteristic curve which exhibits an exponential course.

The invention will be explained more fully with reference to the accompanying drawing which represents, by way of example, one particularly advantageous form of construction of an audiometer according to the invention.

In the audiometer representing the generator for producing a low-frequency alternating voltage of adjustable frequency consists for practical reasons of two differently tuned high-frequency oscillators $O_1$ and $O_2$, which serve for the coarse and fine adjustment respectively of the frequency of the measuring signal, a frequency changer M and a filter F for taking the desired audible frequency from the frequency changer, the differential frequency being supplied, after being amplified with the aid of an amplifier V, to a loudspeaker L. An attenuator D is interposed between amplifier V and loudspeaker L to control the volume of signal applied to the latter. Attenuator D may be of any conventional design, such as an adjustable "T" pad.

The exact system of connections of the audiometer according to the invention is only shown in so far as it is necessary for the explanation of the present invention.

The high-frequency oscillator $O_2$ comprises a triode 1, retroactively connected to an adjustable oscillatory circuit 2 located in the control grid circuit, a grid condenser 3 and a grid resistance consisting of two parts 4 and 5 respectively. An output coil 6 connected in the anode circuit of the triode is coupled with the coil of the oscillatory circuit 2.

In order to be able to switch the measuring signal at will on and off, the control grid circuit of the triode 1 comprises an auxiliary switch 7 which is connected in series with a source of negative grid bias 8 and a resistance 9. The ends of this series-connection are connected to the terminals of a condenser 10 which is connected in parallel with the part 5 of the grid resistance.

For switching off the measuring signal the auxiliary switch 7 is closed, in which event a portion of the voltage of the source 8, which portion corresponds to the proportion of the resistances 5 and 9, is supplied as a negative bias to the control grid of the triode. If for the suppression of the anode current of the triode a negative grid bias of, for example, 5 volts is required, the negative bias supplied to the grid when the auxiliary switch 7 is closed preferably amounts to about 15 volts. When the auxiliary switch is opened in order to switch-on the measuring signal, the condenser 10 slowly discharges through the resistance 15 with the result that the grid voltage gradually increases. By suitably dimensioning the condenser 10 and the resistance 5 it is possible to avoid with certainty that interfering voltages which may occur due to the closure of the direct-current circuit 8, 7, 9, 5 should attain the reproducing device owing to the fact that during the presence of these interfering voltages the anode current of the diode 1 is suppressed.

After a period of time determined by the time constant of the retarding network 10, 9, 5 connected to the time switch 7 has elapsed after the closure of the auxiliary switch 7 the anode current of the triode 1 sets in. However, immediately after the anode current has set in the slope of the triode is, however, not yet sufficient to render possible oscillation of the oscillator. The slope characteristic of the tube increases according as the negative grid bias decreases and at a given instant the system starts oscillating with an amplitude which slowly increases to the final value. The rapidity with which the amplitude increases to its final value may be influenced not only by the rapidity of the decrease of the grid bias by the choice of the characteristic curve of the tube, for example by utilizing a tube having a slope, but also by the choice of the quality of the circuit 2. Since in this way a large measuring signal amplitude is not suddenly supplied to the reproducing device, the interfering voltages occurring in this case can only have very small amplitudes. With the aid of the described system of connections the two above-mentioned principal causes of the production of interfering voltages are consequently substantially avoided whilst, as has been found, with the represented system of connections there are neither encountered inconveniences which are due to interfering voltages set up by non-linear distortion.

What I claim is:

1. In an audiometer including an audio amplifier, an adjustable attenuator and a reproducer coupled to the output of said amplifier through said attenuator, means for supplying audio frequency oscillations to the input of said amplifier comprising an oscillator for producing oscillations having a predetermined amplitude level, and means for selectively in one position abruptly reducing the amplitude level of said oscillator to zero and in another position causing said amplitude level to rise gradually at a prescribed rate from zero to said predetermined level.

2. In an audiometer including an audio amplifier, an adjustable attenuator and a reproducer coupled to the output of said amplifier through said attenuator, means for supplying audio frequency oscillations to the input of said amplifier comprising an oscillator for producing oscillations of a predetermined amplitude and including an electron discharge device having a control grid, and means for selectively applying to said control grid in one position a bias of fixed magnitude effecting an abrupt cessation of said oscillations and in another position a bias of a diminishing magnitude effecting a gradual rise in the amplitude of said oscillations to said predetermined level.

3. In an audiometer having a low frequency amplifier, an adjustable attenuator and a reproducer coupled to the output of said amplifier through said attenuator, means for supplying low frequency oscillations to the input of said amplifier comprising first and second high frequency oscillators, a mixer for combining the frequencies of said oscillators, a filter for deriving the difference frequency from said mixer, and means for applying said difference frequency as an input to said amplifier, said first high frequency oscillator being arranged to produce oscillations of a predetermined amplitude level and including an electron discharge device having a control grid, means for selectively applying to said control grid in one position a bias of a fixed magnitude effecting an abrupt cessation of said oscillations and in another position a bias of diminishing magnitude effecting a gradual rise in the amplitude of said oscillations to said predetermined level.

4. An audiometer comprising means for generating audio frequency oscillations, an amplifier for said oscillations, an adjustable attenuator, and a reproducer connected to the output of said amplifier through said attenuator, said generating means comprising an oscillator for producing oscillations having a predetermined amplitude level and including an electron discharge device having a control grid and a bias circuit for said grid, a source of cut-off potential, switching means operative when closed to apply said potential to said bias circuit to render said device non-conductive and thereby disable said oscillator, and a retarding network chargeably connected to said bias circuit for gradually reducing the value of cut-off potential applied to said grid when said switching means is opened whereby the amplitude of oscillations produced by said oscillator rises slowly at a prescribed rate to said predetermined level.

5. An audiometer comprising means for generating audio frequency oscillations, an amplifier for said oscillations, an adjustable attenuator, and a reproducer connected to the output of said amplifier through said attenuator, said generating means comprising an oscillator for producing oscillations having a predetermined amplitude level and including an electron discharge device having a control grid and a bias circuit for said grid, a source of cut-off potential, switching means operative when closed to apply potential to said bias circuit to render said device non-conductive and thereby disable said oscillator, and a resistance-capacitance delay network chargeably arranged in said bias circuit, said network having a time constant causing a gradual reduction in value of the cut-off potential applied to said grid when said switching means is opened, whereby the amplitude of oscillations produced by said oscillator rises slowly at a prescribed rate to said predetermined level.

6. An audiometer comprising means for generating audio frequency oscillations, an amplifier for said oscillations, an adjustable attenuator, and a reproducer connected to the output of said amplifier through said attenuator, said generating means comprising an oscillator for producing oscillations of a predetermined amplitude level, said oscillator including an electron discharge device having a control grid and an anode and a bias circuit for said grid, said device having an exponential grid voltage-anode current characteristic curve, a source of cut-off potential, switching means operative when closed to apply said potential to said grid bias circuit to render said device non-conductive and thereby disable said oscillator, and a resistance-capacitance delay network arranged in said bias circuit, said network having a time constant in the order of 0.2 seconds whereby the value of cut-off potential applied to said grid is gradually reduced when said switching means is opened thereby causing the amplitude of said oscillations to rise slowly to said predetermined level.

LOURENS BLOK.

REFERENCES CITED

The following references are of record in the file of this patent:

UNITED STATES PATENTS

| Number | Name | Date |
| --- | --- | --- |
| Re. 21,735 | Huth et al. | Mar. 4, 1941 |
| 1,750,960 | Langenbeck et al. | Mar. 18, 1930 |
| 2,072,705 | Bloomheart | Mar. 2, 1937 |
| 2,119,971 | Snead | June 7, 1938 |
| 2,287,401 | Wengel | June 23, 1942 |
| 2,310,588 | Mages | Feb. 9, 1943 |
| 2,257,262 | Koren | Sept. 30, 1947 |